United States Patent
Snyder

(10) Patent No.: US 9,179,653 B1
(45) Date of Patent: Nov. 10, 2015

(54) AUTOMATED FISH TANK CLEANING ASSEMBLY

(71) Applicant: Kyle D. Snyder, Indianapolis, IN (US)

(72) Inventor: Kyle D. Snyder, Indianapolis, IN (US)

( * ) Notice: Subject to any disclaimer, the term of this patent is extended or adjusted under 35 U.S.C. 154(b) by 8 days.

(21) Appl. No.: 14/266,310

(22) Filed: Apr. 30, 2014

(51) Int. Cl.
*A01K 63/04* (2006.01)
*A01K 63/00* (2006.01)

(52) U.S. Cl.
CPC .................................... *A01K 63/003* (2013.01)

(58) Field of Classification Search
CPC .......... B08B 1/008; B08B 1/002; B08B 1/04; B08B 3/04; B08B 9/0856; A01K 61/003; A01K 63/045; B01D 21/0006
USPC .............. 119/264, 269, 259; 15/220.1, 220.2, 15/1.7, 105
See application file for complete search history.

(56) References Cited

U.S. PATENT DOCUMENTS

| | | | |
|---|---|---|---|
| 353,715 A | 12/1886 | Shryock | |
| 3,337,889 A * | 8/1967 | West | 15/1.7 |
| 3,906,572 A * | 9/1975 | Winn | 15/1.7 |
| 4,913,811 A * | 4/1990 | Huang et al. | 210/167.27 |
| 4,978,447 A * | 12/1990 | Hall | 210/241 |
| 5,706,539 A * | 1/1998 | Fukuda | 15/1.7 |
| 5,720,890 A * | 2/1998 | Caliva | 210/800 |
| 5,806,463 A | 9/1998 | Rising | |
| 5,975,022 A * | 11/1999 | Miller | 119/264 |
| 6,016,924 A * | 1/2000 | Caliva | 210/528 |
| 7,832,030 B2 * | 11/2010 | Nunez et al. | 4/661 |
| 2002/0073493 A1 * | 6/2002 | Walton | 15/1.7 |
| 2003/0213078 A1 | 11/2003 | Kristofek | |
| 2004/0031118 A1 | 2/2004 | Hanson | |
| 2004/0194237 A1 | 10/2004 | Walton | |

* cited by examiner

Primary Examiner — Yvonne Abbott-Lewis

(57) ABSTRACT

An automated fish tank cleaning assembly automatically cleans a fish tank. The assembly includes an upper housing and a processor coupled to and positioned in the upper housing. Support arms are extend from the upper housing supporting the upper housing on a fish tank. Each of a plurality of rollers is coupled an associated one of the support arms. Each of the rollers is operationally coupled to the processor wherein the rollers move the upper housing relative to the fish tank. A lower housing is coupled to the upper housing by a connection conduit extending between the upper housing and the lower housing. A plurality of cleaning arms is coupled to and extends from the lower housing. Each of a plurality of brushes is coupled to a distal end of an associated one of the cleaning arms relative to the lower housing.

16 Claims, 10 Drawing Sheets

AUTOMATED FISH TANK CLEANING ASSEMBLY

BACKGROUND OF THE DISCLOSURE

Field of the Disclosure

The disclosure relates to tank cleaning devices and more particularly pertains to a new tank cleaning device for automatically cleaning a fish tank.

SUMMARY OF THE DISCLOSURE

An embodiment of the disclosure meets the needs presented above by generally comprising an upper housing and a processor coupled to and positioned in the upper housing. A plurality of support arms is coupled to and extends from the upper housing wherein the upper housing is configured for being supported on a fish tank. Each of a plurality of rollers is coupled to a distal end of an associated one of the support arms relative to the upper housing. Each of the rollers is operationally coupled to the processor wherein the rollers are configured to move the upper housing relative to the fish tank. A lower housing is coupled to the upper housing by a connection conduit extending between the upper housing and the lower housing. A plurality of cleaning arms is coupled to and extends from the lower housing. Each of a plurality of brushes is coupled to a distal end of an associated one of the cleaning arms relative to the lower housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
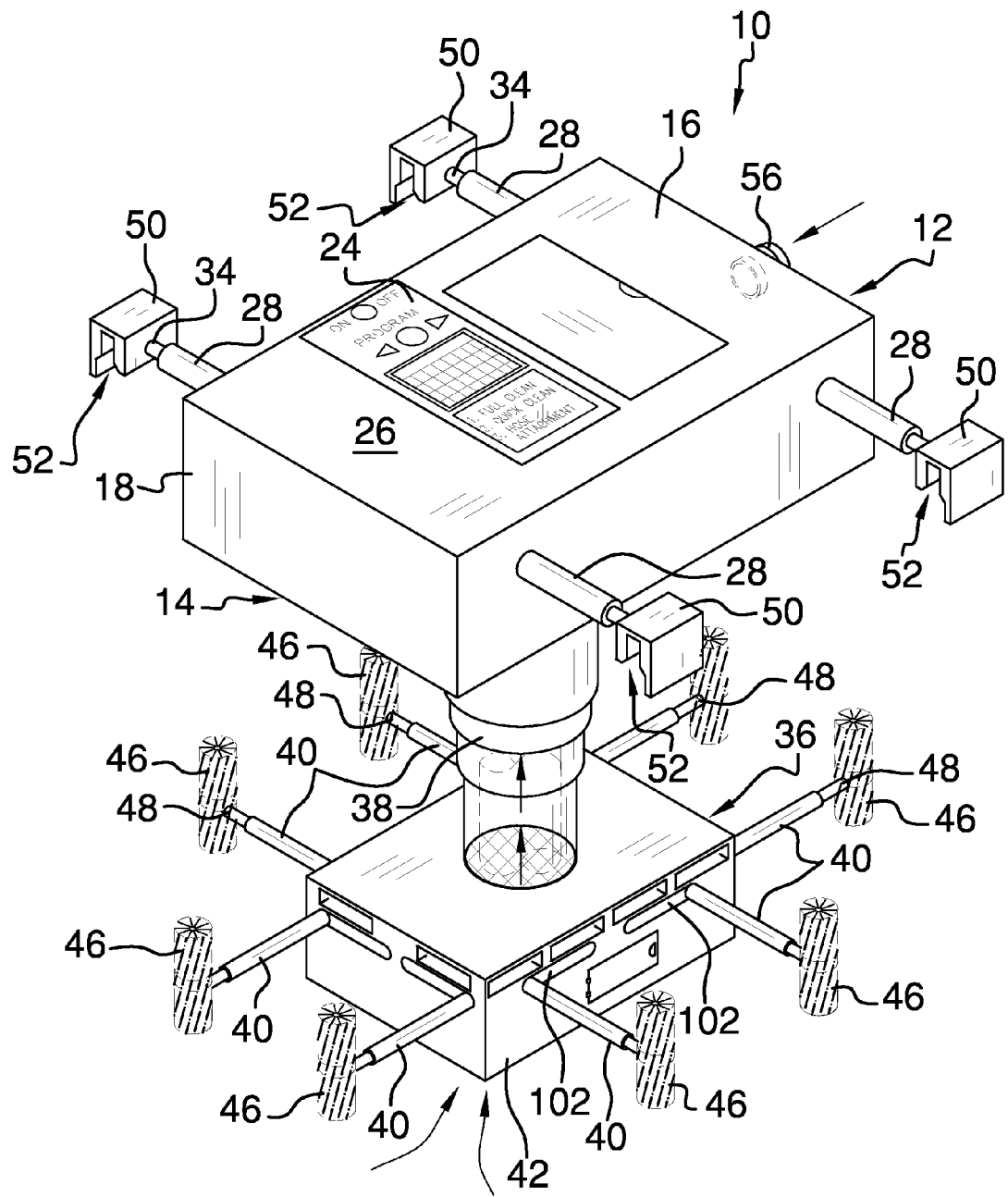
FIG. 1 is a top front side perspective view of an automated fish tank cleaning assembly according to an embodiment of the disclosure.
Figure 2:
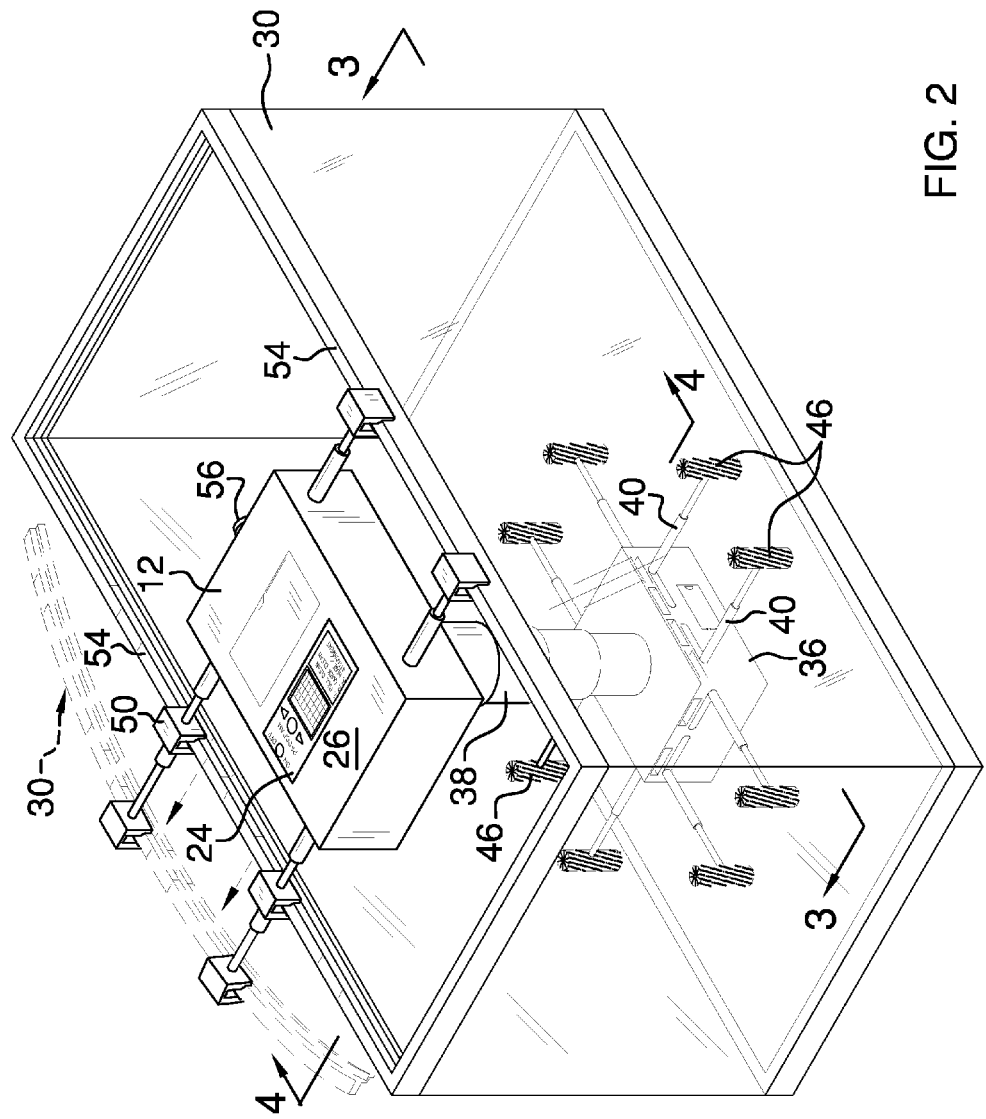
FIG. 2 is a top front side perspective view of an embodiment of the disclosure in use.
Figure 3:
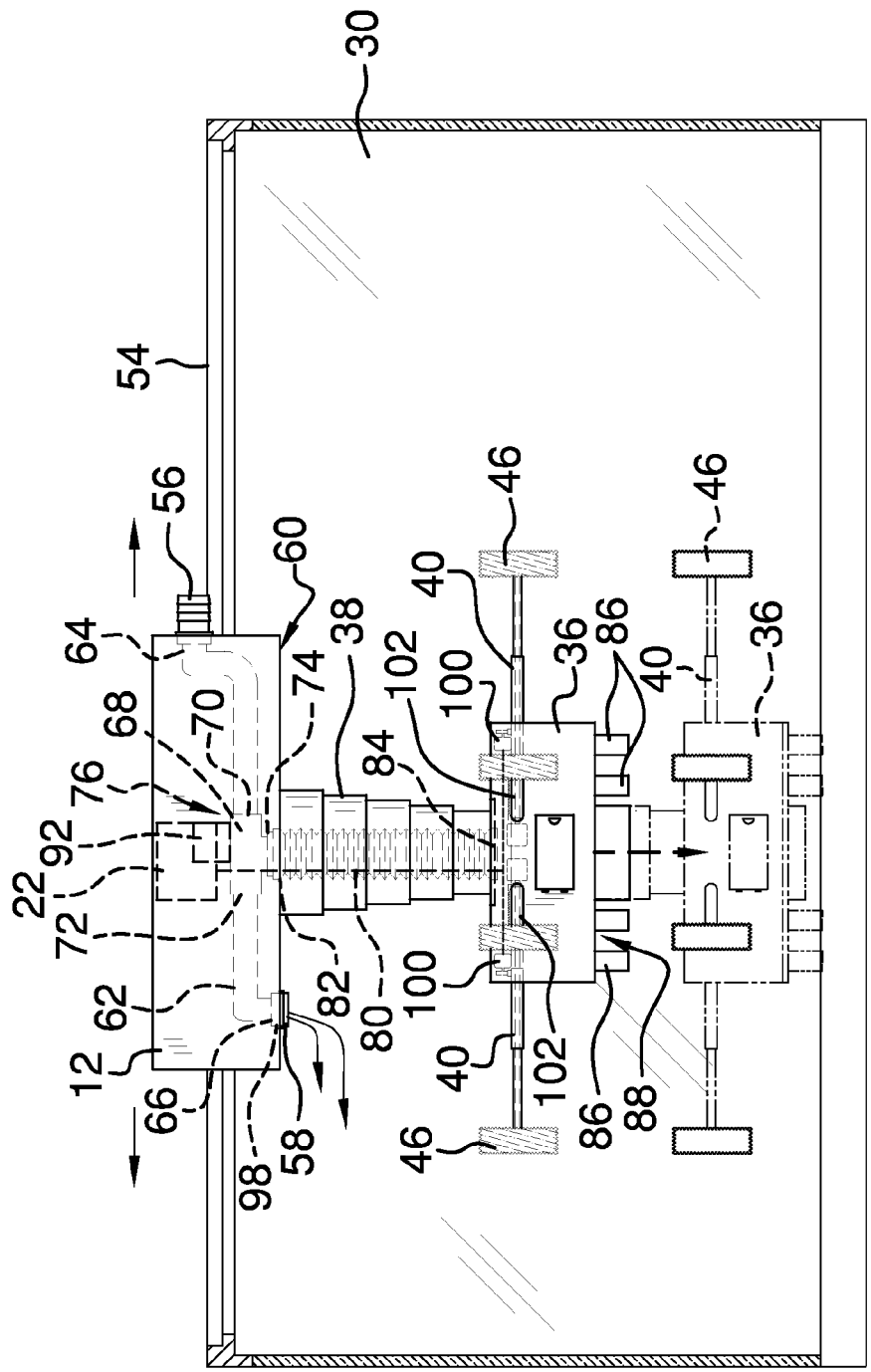
FIG. 3 is a side view of an embodiment of the disclosure.
Figure 4:
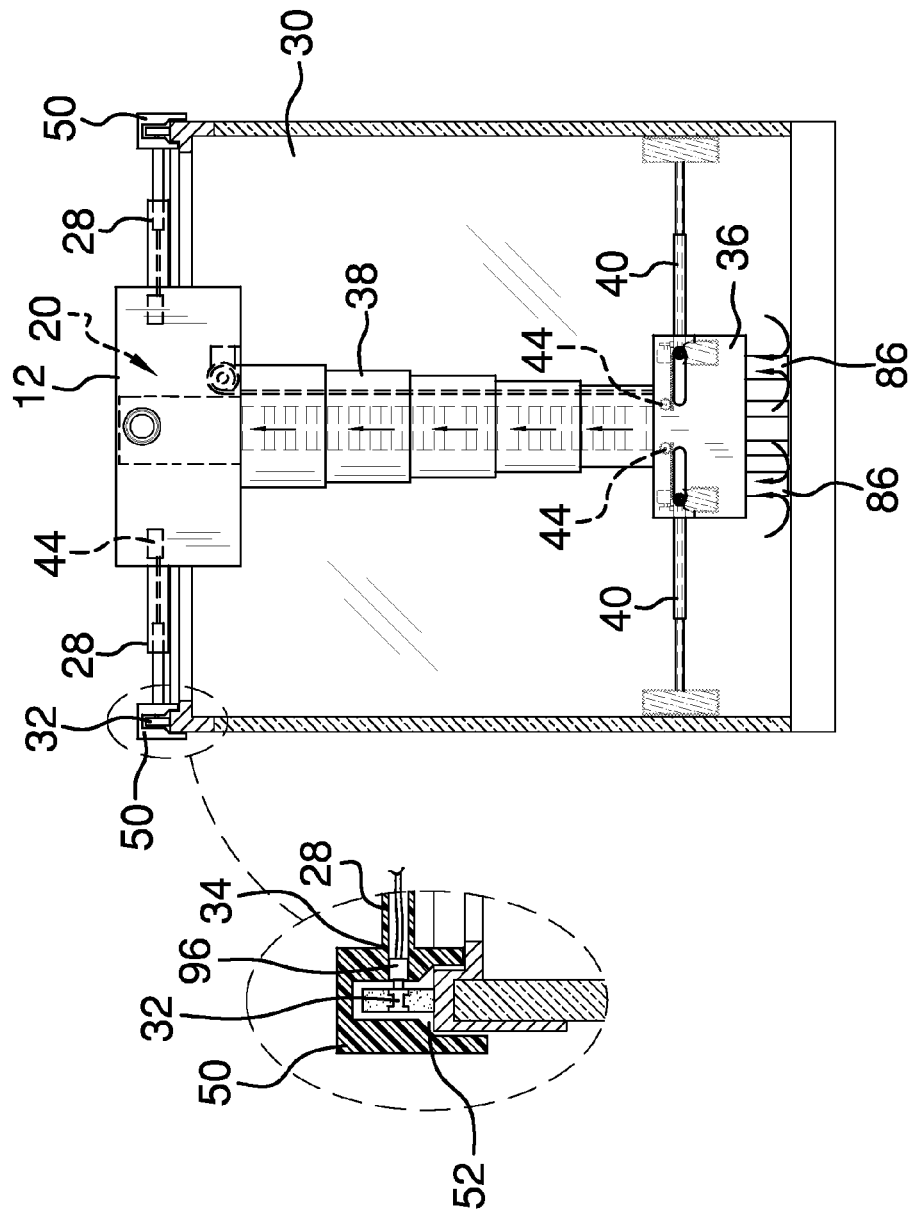
FIG. 4 is a front view of an embodiment of the disclosure.
Figure 5:
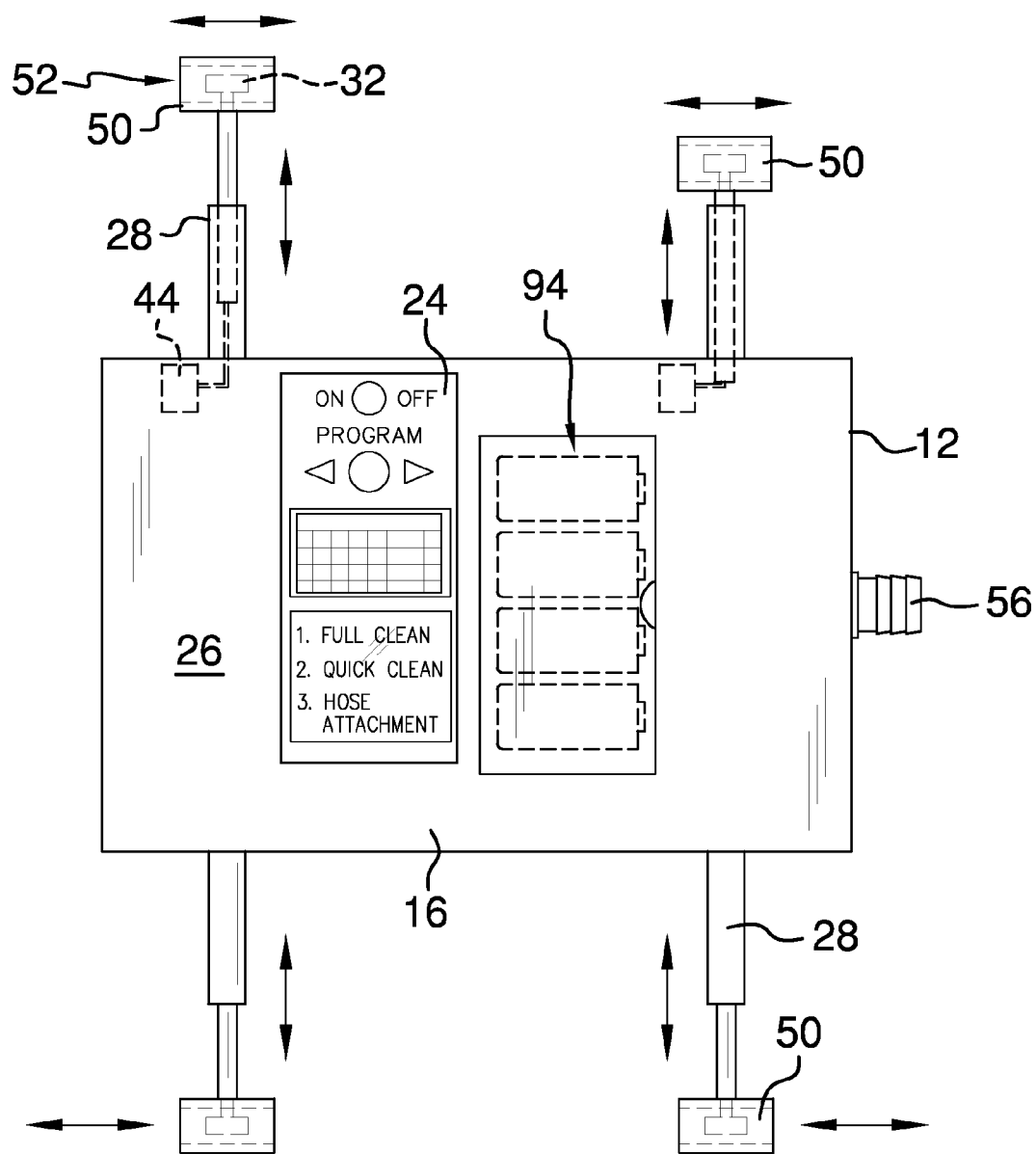
FIG. 5 is a top view of an embodiment of the disclosure.
Figure 6:
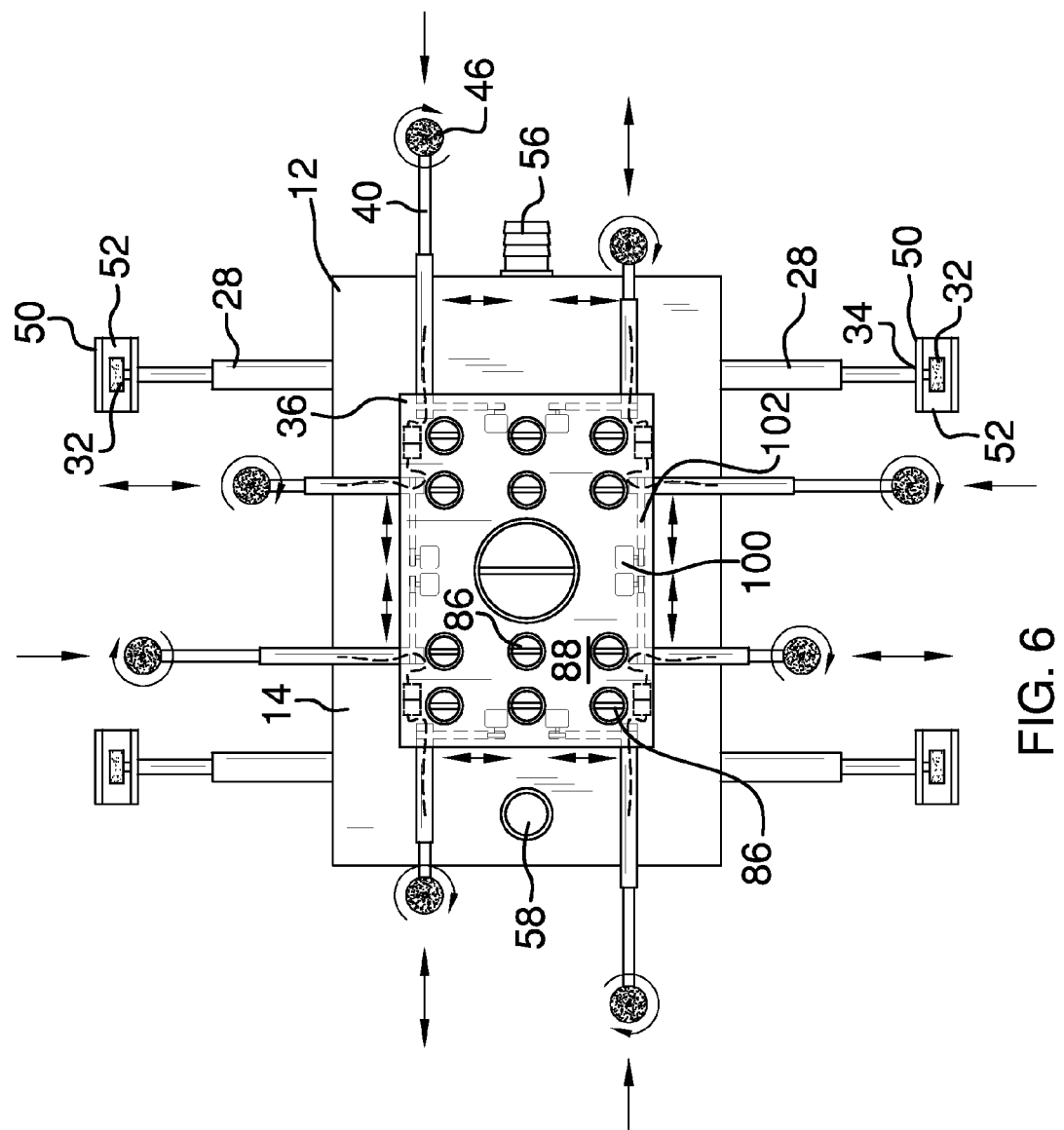
FIG. 6 is a bottom view of an embodiment of the disclosure.
Figure 7:
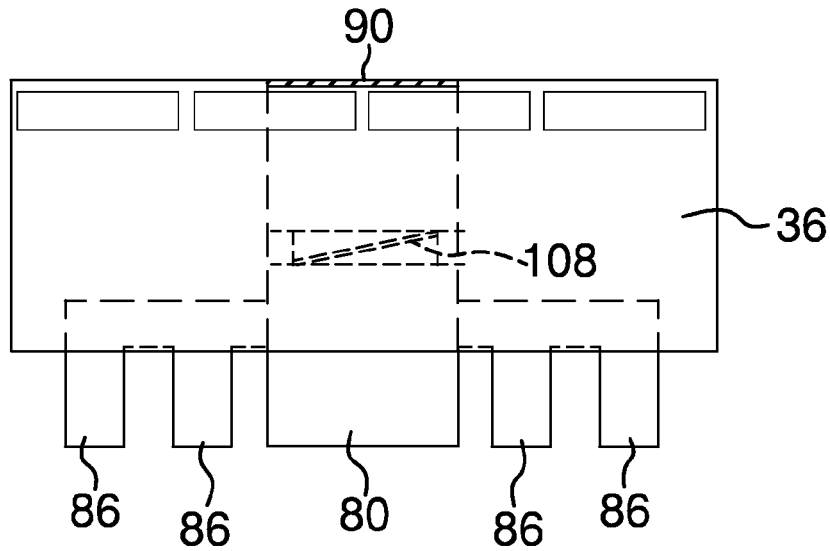
FIG. 7 is a front view of a lower section of an embodiment of the disclosure.
Figure 8:
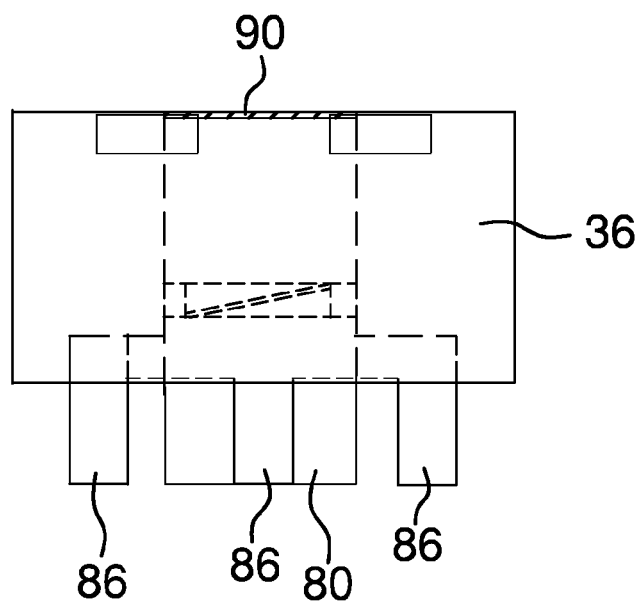
FIG. 8 is a side view of a lower section of an embodiment of the disclosure.
Figure 9:
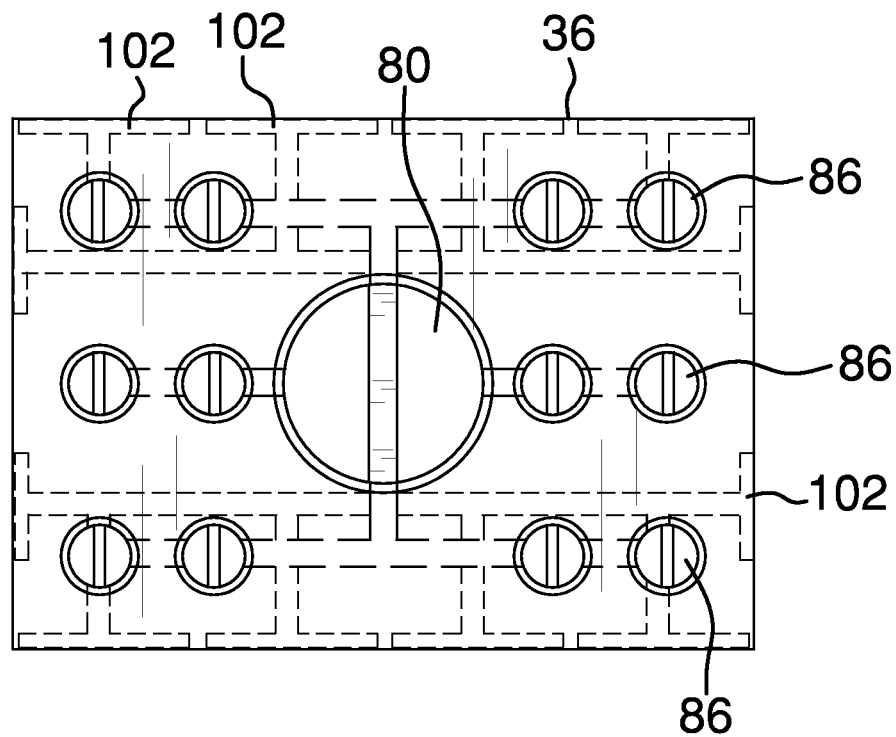
FIG. 9 is a bottom view of an embodiment of the disclosure.
Figure 10:
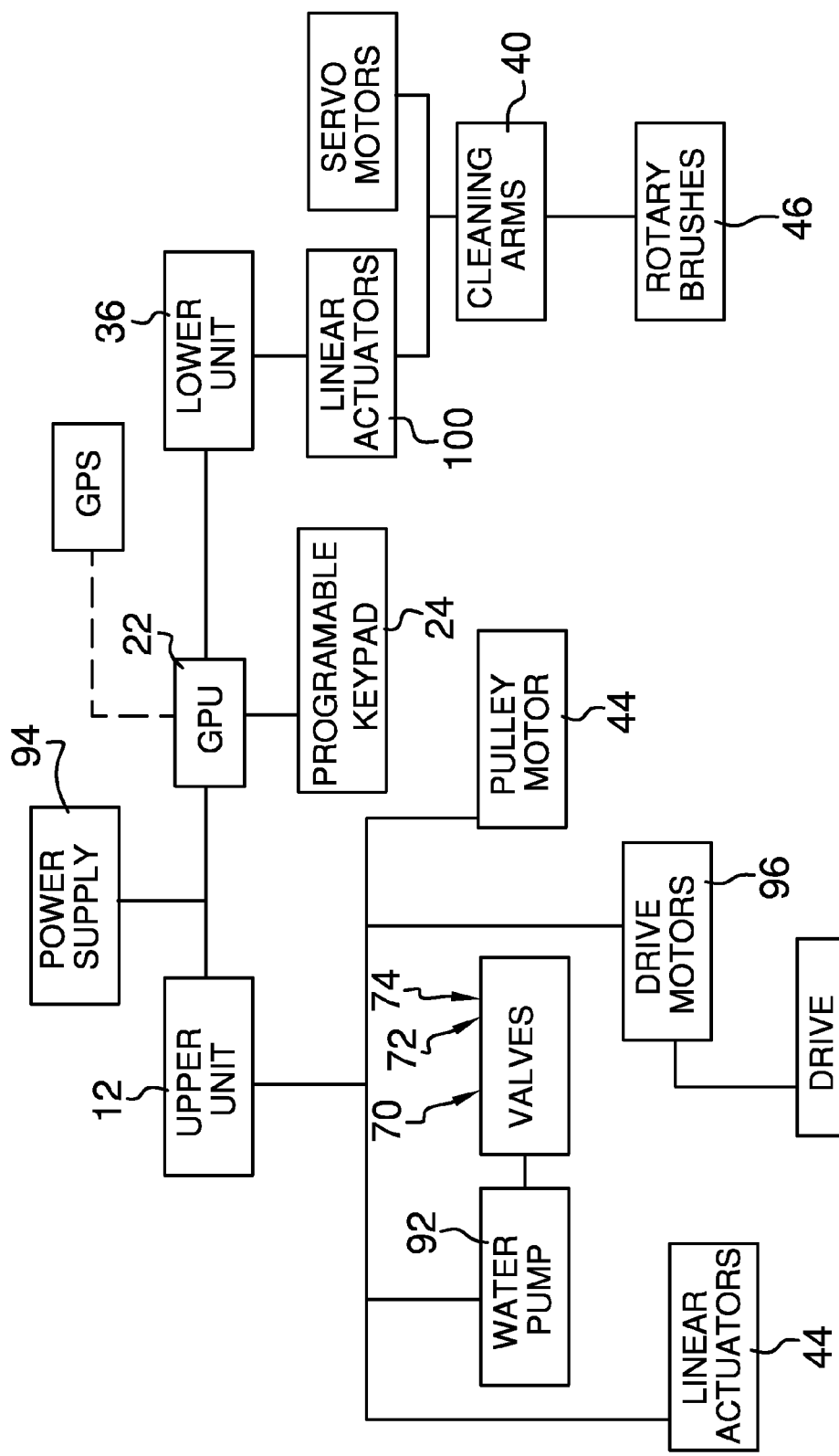
FIG. 10 is a schematic view of an embodiment of the disclosure.
Figure 11:
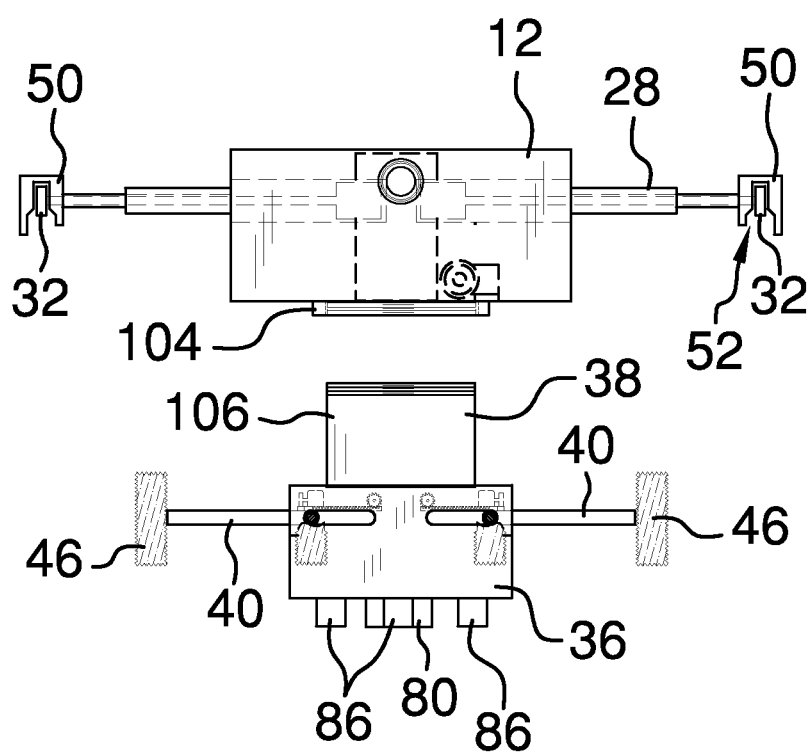
FIG. 11 is a partially exploded front view of an embodiment of the disclosure.

With reference now to the drawings, and in particular to FIGS. 1 through 11 thereof, a new tank cleaning device embodying the principles and concepts of an embodiment of the disclosure and generally designated by the reference numeral 10 will be described.

As best illustrated in FIGS. 1 through 11, the automated fish tank cleaning assembly 10 generally comprises an upper housing 12 having a bottom wall 14, an upper wall 16 and a perimeter wall 18 coupled to and extending between the bottom wall 14 and the upper wall 16 defining an interior space 20. A processor 22 is coupled to the upper housing 12 and positioned in the interior space 20 of the upper housing 12. A control panel 24 is coupled to the upper housing 12 and positioned on an upper surface 26 of the upper wall 16 of the upper housing 12 for controlling the various functions described below.

A plurality of support arms 28 is coupled to and extends from opposite sides of the upper housing 12 wherein the upper housing 12 is configured for being supported on a fish tank 30. Each of a plurality of rollers 32 is coupled to a distal end 34 of an associated one of the support arms 28 relative to the upper housing 12. Each support arm 28 may be telescopic and coupled to a linear actuator 44 to selectively extend the support arm 28 from the upper housing 12. Each of the rollers 32 is operationally coupled to the processor 22 wherein the rollers 32 move the upper housing 12 back and forth relative to the fish tank 30. Each of a plurality of guides 50 is coupled to an associated one of the support arms 28. Each guide 50 has a slot 52 extending therethrough. Each roller 32 is positioned in the slot 52 of an associated one of the guides 50 such that each roller 32 abuts an upper edge 54 of the fish tank 30 when the slot 52 is positioned to extend over and around the upper edge 54 of the fish tank 30. Thus, the upper edge 54 is seated in the slots 52 and the rollers 32 frictionally engage the upper edge 54 to move the upper housing 12 relative to the fish tank 30.

A lower housing 36 is coupled to the upper housing 12 by a connection conduit 38 extending between the upper housing 12 and the lower housing 36. The connection conduit 38 is telescopic and operationally coupled to the processor 22 wherein vertical spacing between the upper housing 12 and the lower housing 36 is adjustable by the processor 22. Thus, the lower housing 36 is extended down into the fish tank 30. The connection conduit 38 may be selectively separable from the upper housing 12, the lower housing 36, or have separable upper and lower sections 104,106 to facilitate separating the upper housing 12 from the lower housing 36 when desired.

A plurality of cleaning arms 40 is coupled to and extends from a peripheral wall 42 of the lower housing 36. Each of the cleaning arms 40 is telescopic and may be controlled by mechanical connection to an associated individual linear actuator 44. Each cleaning arm 40 is operationally coupled to the processor 22 wherein each cleaning arm 40 is extendable relative to the lower housing 36. Each of a plurality of brushes 46 is coupled to a distal end 48 of an associated one of the cleaning arms 40 relative to the lower housing 36. Each brush 46 is rotatably coupled to the associated cleaning arm 40 and operationally coupled to the processor 22 so that the brushes 46 extend and rotate to contact and clean an inner surface of the fish tank 30. Each brush 46 may be elongated, cylindrical, and vertically oriented. Linear actuators 100 may be coupled to the lower housing 36. Each linear actuator 100 is mechanically coupled to an associated one of the cleaning arms 40 to move the associated cleaning arm 40 within an associated horizontal slit 102 in the lower housing 36. Each linear actuator 100 is operationally coupled to the processor 22. Thus, the brushes 46 may be moved laterally relative to the lower housing 36.

A water inlet port 56 is a one-way valve coupled to and positioned on the upper housing 12 extending through the perimeter wall 18. A water outlet port 58 is a one-way valve positioned on a bottom surface 60 of the upper housing 12 extending through the bottom wall 14. A water line 62 extends through the interior space 20 having a first end 64 coupled to the water inlet port 56 and a second end 66 coupled to the water outlet port 58. A filter 98 is coupled to the water line 62 between the first end 64 and the second end 66. Thus, water passing through the water line 62 is filtered and passed into the fish tank 30. A T-valve 68 has an input opening 70, an output opening 72, and a one-way suction opening 74. The input opening 70 and the output opening 72 are coupled to a medial section 76 of the water line 62 within the upper housing 12. An accordion type suction hose 80 has an upper end 82 coupled to the suction opening 74 of the T-valve 68. The suction hose 80 extends through the connection conduit 38 such that a lower end 84 of the suction hose 80 extends into the lower housing 36. Each of a plurality of suction ports 86 is coupled to the lower housing 36. Each suction port 86 is coupled to the lower end 84 of the suction hose 80 to produce suction through each suction port 86. Each suction port 86 extends from a bottom surface 88 of the lower housing 36. A screen 90 is coupled to the suction hose 80 between each suction port 86 and the T-valve 68 to prevent large debris from passing from the lower housing 36 through the connection conduit 38. A one-way valve 108 may also be positioned in the suction hose 80 between the suction ports 86 and the screen 90.

A water pump 92 may be positioned in the upper housing 12. The water pump 92 is operationally coupled to the water line 62 for pumping water from the water inlet port 56 to the water outlet port 58. A power supply 94 is coupled to the upper housing 12 and may be a battery to be self-contained within the upper housing 12. Each of a plurality of motors 96 is coupled to the distal end 34 of an associated one of the support arms 28 and operationally coupled to an associated one of the rollers 32.

In use, the lower housing 36 is inserted into the fish tank 30 and the support arms 28 engaged to the fish tank 30 such that the rollers 32 engage the upper edge 54 of the fish tank 30. The control panel 24 is used to input desired settings into the processor 22 to control the rollers 32, connection conduit 38, cleaning arms 40, brushes 46, linear actuators 100, and water pump 92 such that the lower housing 36 is moved within the fish tank 30 to clean the fish tank 30 automatically. Sensors may be incorporated to provide feedback to the processor 22 to prevent overextension of the cleaning arms 40 or extension of the connection conduit 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An automated fish tank cleaning assembly comprising:
   an upper housing;
   a processor coupled to and positioned in said upper housing;
   a plurality of support arms coupled to and extending from said upper housing wherein said upper housing is configured for being supported on a fish tank;
   a plurality of rollers, each roller being coupled to a distal end of an associated one of said support arms relative to said upper housing, each of said rollers being operationally coupled to said processor wherein said rollers are configured to move said upper housing relative to the fish tank;
   a lower housing;
   a connection conduit coupled to and extending between said upper housing and said lower housing;
   a plurality of cleaning arms coupled to and extending from said lower housing; and
   a plurality of brushes, each of said brushes being coupled to a distal end of an associated one of said cleaning arms relative to said lower housing.

2. The assembly of claim 1, further comprising a plurality of guides, each guide being coupled to an associated one of said support arms, each guide having a slot extending therethrough, each roller being positioned in said slot of an associated one of said guides wherein each said roller is configured for abutting an upper edge of the fish tank the slot is positioned to extend over and around the upper edge of the fish tank.

3. The assembly of claim 1, further comprising said connection conduit being telescopic, said connection conduit being operationally coupled to said processor wherein vertical spacing between said upper housing and said lower housing is adjustable by said processor.

4. The assembly of claim 1, further comprising each of said cleaning arms being telescopic, each cleaning arm being operationally coupled to said processor wherein each brush is extendable relative to said lower housing.

5. The assembly of claim 4, further comprising each brush being rotatably coupled to said associated cleaning arm.

6. The assembly of claim 1, further comprising a control panel coupled to said upper housing, said control panel being positioned on an upper surface of said upper housing.

7. The assembly of claim 1, further comprising:
   a water inlet port coupled to said upper housing
   a water outlet port positioned on a bottom surface of said upper housing; and
   a water line having a first end coupled to said water inlet port and a second end coupled to said water outlet port.

8. The assembly of claim 7, further comprising a filter coupled to said water line between said first end and said second end.

9. The assembly of claim 7, further comprising a T-valve having an input opening, an output opening, and a one-way suction opening, said input opening and said output opening being coupled to a medial section of said water line.

10. The assembly of claim 9, further comprising a suction hose having an upper end coupled to said suction opening of said T-valve, said suction hose having a lower end extending into said lower housing.

11. The assembly of claim 10, further comprising a plurality of suction ports, each suction port being coupled to said lower housing, each suction port being coupled to said lower end of said suction hose.

12. The assembly of claim 11, further comprising each said suction port extending from a bottom surface of said lower housing.

13. The assembly of claim 11, further comprising a screen coupled to said suction hose between each said suction port and said T-valve.

14. The assembly of claim 7, further comprising a water pump positioned in said upper housing, said water pump being operationally coupled to said water line for pumping water from said water inlet port to said water outlet port.

15. The assembly of claim 1, further comprising:
 a power supply coupled to said upper housing; and
 a plurality of motors, each motor being coupled to a distal end of an associated one of said support arms, each of said rollers being operationally coupled to an associated one of said motors.

16. An automated fish tank cleaning assembly comprising:
 an upper housing;
 a processor coupled to and positioned in said upper housing;
 a plurality of support arms coupled to and extending from said upper housing wherein said upper housing is configured for being supported on a fish tank;
 a plurality of rollers, each roller being coupled to a distal end of an associated one of said support arms relative to said upper housing, each of said rollers being operationally coupled to said processor wherein said rollers are configured to move said upper housing relative to the fish tank;
 a lower housing;
 a connection conduit coupled to and extending between said upper housing and said lower housing, said connection conduit being telescopic, said connection conduit being operationally coupled to said processor wherein vertical spacing between said upper housing and said lower housing is adjustable by said processor;
 a plurality of cleaning arms coupled to and extending from said lower housing, each of said cleaning arms being telescopic, each cleaning arm being operationally coupled to said processor wherein each cleaning arm is extendable relative to said lower housing;
 a plurality of brushes, each of said brushes being coupled to a distal end of an associated one of said cleaning arms relative to said lower housing, each brush being rotatably coupled to said associated cleaning arm;
 a plurality of guides, each guide being coupled to an associated one of said support arms, each guide having a slot extending therethrough, each roller being positioned in said slot of an associated one of said guides wherein each said roller is configured for abutting an upper edge of the fish tank the slot is positioned to extend over and around the upper edge of the fish tank;
 a control panel coupled to said upper housing, said control panel being positioned on an upper surface of said upper housing;
 a water inlet port coupled to said upper housing
 a water outlet port positioned on a bottom surface of said upper housing; and
 a water line having a first end coupled to said water inlet port and a second end coupled to said water outlet port;
 a filter coupled to said water line between said first end and said second end;
 a T-valve having an input opening, an output opening, and a one-way suction opening, said input opening and said output opening being coupled to a medial section of said water line;
 a suction hose having an upper end coupled to said suction opening of said T-valve, said suction hose having a lower end extending into said lower housing;
 a plurality of suction ports, each suction port being coupled to said lower housing, each suction port being coupled to said lower end of said suction hose, each said suction port extending from a bottom surface of said lower housing;
 a screen coupled to said suction hose between each said suction port and said T-valve;
 a water pump positioned in said upper housing, said water pump being operationally coupled to said water line for pumping water from said water inlet port to said water outlet port;
 a power supply coupled to said upper housing; and
 a plurality of motors, each motor being coupled to a distal end of an associated one of said support arms, each of said rollers being operationally coupled to an associated one of said motors.

\* \* \* \* \*